June 14, 1966 R. A. MOMBERGER 3,256,502
SYNC PULSE SEPARATING AND AGC CIRCUITRY
Filed Feb. 28, 1964
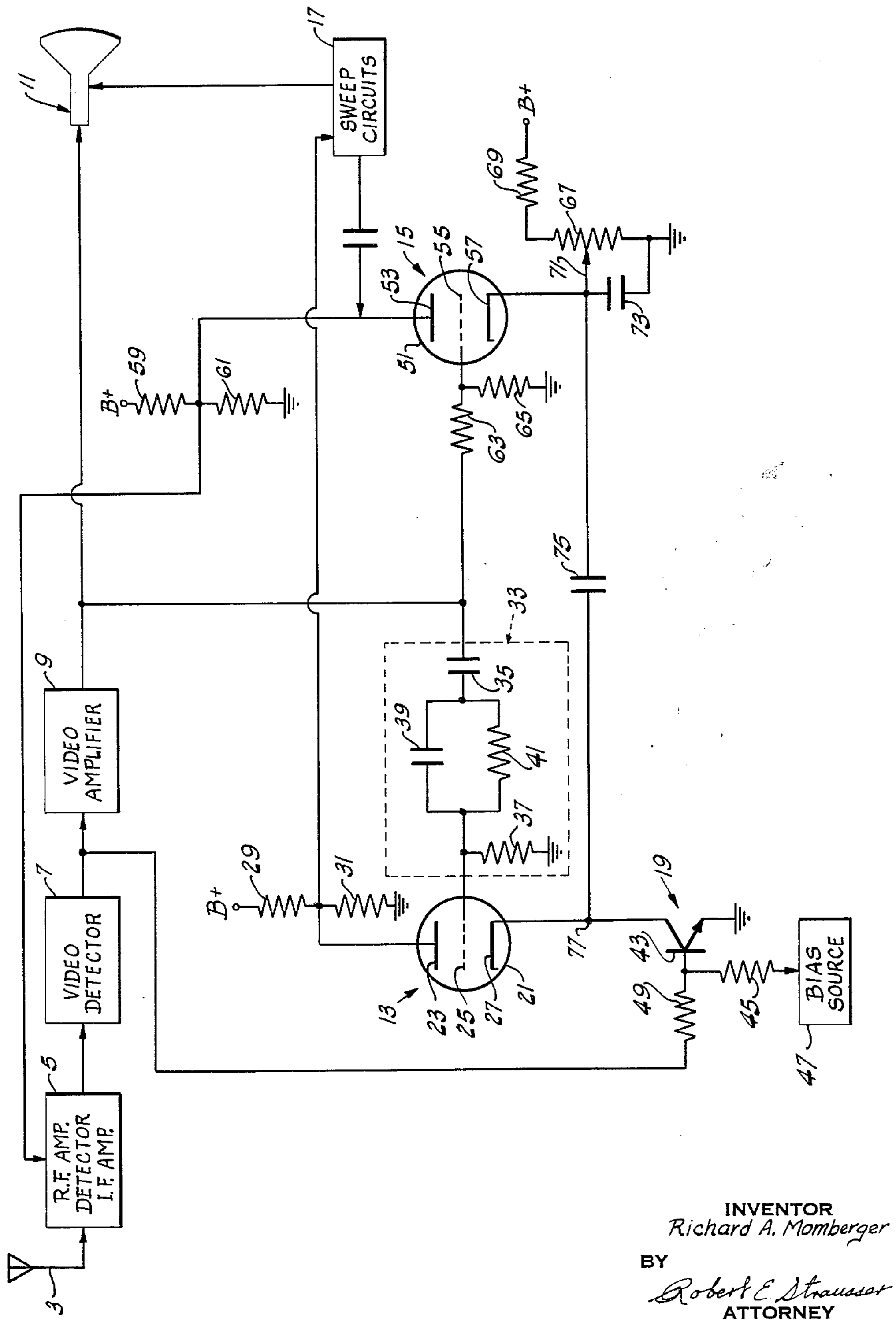
INVENTOR
Richard A. Momberger
BY
Robert E. Strausser
ATTORNEY United States Patent Office 3,256,502
Patented June 14, 1966

3,256,502
SYNC PULSE SEPARATING AND AGC CIRCUITRY

Richard A. Momberger, Batavia, N.Y., assignor to Sylvania Electric Products Inc., a corporation of Delaware Filed Feb. 28, 1964, Ser. No. 348,041
8 Claims. (Cl. 178—7.3)

This invention relates generally to television receivers utilizing a signal which includes synchronizing pulses and may include noise pulses of greater amplitude than the synchronizing pulses and more particularly to television receivers having a synchronizing pulse separating means and automatic gain control (AGC) voltage development means whose function is substantially unaffected by noise pulses contained in a received signal.

In the television art, it is well known that electron beam movement in the viewing camera must be exactly duplicated in the picture tube or display device of the receiver if the scene viewed by the camera is to be faithfully reproduced. In order to provide such duplication, the deflection voltages on the camera coils and on the picture tube coils are controlled by synchronizing pulses which are generated in the transmitter associated with the camera and transmitted to the receiver in a composite video signal. In addition to the synchronizing pulses, the composite signal also includes the picture signals, horizontal and vertical blanking pulses, equalizing pulses, and may include random noise pulses.

At the receiver the strength of the signal intercepted by the antenna varies greatly for numerous uncontrollable reasons and the synchronizing pulses must be separated from the composite signal if synchronized control of the scanning voltages of the picture tube is to be obtained. Thus, circuitry is provided in the receiver for separating the synchronizing pulses from the composite video signal and automatically controlling the sign (AGC) or amplification of the receiver in a manner such that the strength of the signal applied to the picture tube remains substantially constant regardless of the strength of the received signal.

Unfortunately, the composite video signal arriving at the receiver frequently includes random noise pulses which have an amplitude greater than the amplitude of the sync pulses contained therein. Moreover, the circuitry for separating the synchronizing pulses from the signal and developing the AGC voltages is dependent upon the amplitude of the synchronizing pulses for correct operation. Thus, compensating features must be included in this circuitry if the effects of the noise pulses are to be eradicated or at least greatly reduced.

For years, the effects of random noise pulses on the separation of the sync pulses from a signal have been reduced by a system wherein a composite video signal is applied in phase opposition to separate grids of a multi-grid electron discharge device. Usually, the signal is applied to the control grid of the discharge device through a resistor-capacitor network wherein a bias is developed on the discharge device by current drawn from the grid of the device during the occurrence of the sync pulses. Thus, the discharge device is biased to nonconduction except during the application of the sync pulses and the only signal obtainable from the device is the sync pulses.

However, it has been found that random noise pulses having a greater amplitude than the sync pulses cause the sync pulse separating means to conduct excessively. This excessive conduction increases the self-developed bias on the device which is often referred to as "backing off" the device. As a result of the increased bias, the device is no longer able to conduct during the application of the sync pulses thereto but is rendered conductive by noise pulses having an amplitude greater than the amplitude of the sync pulses. Thus, the random noise pulses rather than the sync pulses are separated from the composite signal by the device and synchronization between the transmitter and receiver is lost.

Also, the AGC system in most receivers usually includes an electron discharge device having a filter network through which the output of the device is coupled back to and controls the amplification of either or both the RF and IF amplifier stages of the receiver. Thus, a strong signal applied to the AGC system is coupled back to the earlier stages of the receiver in a manner such that the amplification of strong signals is reduced while the amplification of weak signals is increased. However, it has been found that random noise pulses which do reach such an AGC system can act thereon to cause an increased output which, as mentioned above, is coupled back to the RF and IF amplifier stages and causes a cumulative deterioration of the signal to noise ratio of the receiver.

The above-mentioned conditions have been greatly alleviated by circuitry which includes a noise-gate transistor in the cathode circuits of the discharge devices in the sync separating means and AGC means as disclosed in the copending application of Joseph V. DeMarinis entitled "Noise Suppression Circuit," Serial No. 334,735, filed December 31, 1963. Herein, a transistor is biased to saturated current flow for signals whose amplitude is not greater than the amplitude of the sync pulses contained therein. However, when random noise pulses of greater amplitude than the amplitude of the sync pulses are applied to the transistor, current conduction therethrough is greatly reduced and the discharge device of the sync pulse separating means is, for all practical purposes, disabled. Thus, the above-mentioned development of increased bias in the separating means by random noise pulses is prevented by reducing the current flow through the separating means when the noise pulses are applied thereto. As a result, the function of separating out the sync pulses from the composite signal is substantially unaffected by the presence of random noise pulses in the signal.

Also, the AGC voltage developing means which includes therein an electron discharge device having a cathode A.C. coupled to the transistor provides a substantially uniform output even though the signal may include random noise pulses. Therein, a random noise pulse applied to the control grid of a discharge device is simultaneously applied in phase opposition to the base of the noise-gate transistor. This signal applied to the transistor base greatly reduces the current flow therethrough and provides a positive-going pulse therefrom which is A.C. coupled to the cathode of the AGC discharge device at the same time as the increased signal is applied to the control grid. In this manner, cancellation of the increased signal is effected and the bias developed by and available from the AGC means remains substantially unchanged.

Nevertheless, it has been found that the maximum noise immunity capability of a television receiver has not been achieved by any of the known circuitry including the above-mentioned noise-gate transistor circuitry. For example, noise-gate transistor circuitry having the signal A.C. coupled thereto permits the use of noise cancellation in the AGC system which prevents noise pulses from altering the bias voltage available therefrom and causing a deterioration of the signal-to-noise ratio of the receiver. However, this same A.C. coupling of the negative-going signal to the noise-gate transistor prevents utilization of the total available voltage to activate the noise-gate and maximum capability is not realized.

Additionally, when the negative-going signal is D.C. coupled to any of the known noise-gate transistor circuitry, noise cancellation in the AGC means suffers because of a regenerative video overload condition which occurs whenever the signal varies from a weak or no signal condition to a strong signal. At such a moment, the strong signal, for all practical purposes, cuts off the flow of current through the transistor and a positive pulse is coupled to the cathode of the AGC discharge device which reduces the conduction thereof substantially. This reduced conduction reduces the output from the AGC amplifier which in turn is coupled back as a reduced amount of bias on the RF and IF amplifier stages and allows this strong signal to keep the noise-gate transistor cut off. Since the AGC amplifier depends upon current conduction of the noise-gate transistor to provide cathode by-passing and this A.C. path is no longer available, the AGC amplifier is rendered degenerative and proper bias development thereby is destroyed causing the overload condition to remain.

Moreover, the strong video signal available from the video detector causes sync clipping by the video amplifier because of the limited signal handling capability thereof. Combining this sync clipping with the disablement of the receiver synchronization circuitry because the sync pulse separating circuitry will not function with the noise-gate transistor rendered nonconductive by the above-mentioned strong video signal, the AGC amplifier ceases to function since there are no positive pulses at the control grid thereof to coincide with the "gated" pulses applied to the anode. As a result, the AGC amplifier does not perform its function and the overload condition is sustained.

Therefore, it is an object of this invention to enhance the noise immunity capabilities of a television receiver which includes transistorized noise-gate circuitry.

Another object of this invention is to reduce the effects of noise on the functional operation of a television receiver.

A further object of the invention is to enhance the operation of a television receiver for utilizing signals which may include noise pulses having an amplitude greater than the synchronizing pulses contained therein.

A still further object of the invention is to provide improved circuitry for separating the synchronizing pulses and developing AGC voltages in a television receiver from a signal which may include random noise pulses having a greater amplitude than the synchronizing pulses therein.

Another object of the invention is to provide noise-gate transistorized circuitry which improves the noise immunity capabilities of a television receiver.

Still another object of the invention is to reduce the cost and improve the noise immunity capabilities of a synchronizing pulse separating means and AGC means in a television receiver.

Briefly, these and other objects are achieved in one aspect of the invention by a noise-gate transistor means D.C. connected to a negative-going signal source and biased to saturated current flow for signals having an amplitude equal to or less than the amplitude of the synchronizing pulses in a composite signal. This transistor means is directly connected intermediate a sync pulse separating means and circuit ground and A.C. coupled intermediate an AGC means and circuit ground. The AGC means is also directly connected to a reference voltage source by-passed to circuit ground to provide an A.C. path for said AGC means when current conduction through the transistor is reduced.

For a better understanding of the present invention, together with other and further objects, advantages, and capabilities thereof, reference is made to the following disclosure and appended claims in conjunction with the accompanying drawing in which the sole figure is a combination block and schematic diagram of a television receiver.

Referring to the drawing, the conventional stages of a television receiver are illustrated in block form and further explanation thereof is deemed unnecessary in view of the well-known usage in the art. These stages include an antenna 3 for intercepting a transmitted signal; RF amplifiers, a detector, and IF amplifiers, block 5; a video detector 7; a video amplifier 9; and a picture tube 11. All of these stages are cooperatively connected to provide a signal to the picture tube 11.

Also, the signal available from the video amplifier 9 is coupled to a separating means 13 as well as to an automatic gain control (AGC) means 15. The separating means 13 functions in a manner such that the synchronizing pulses included in the signal applied thereto are separated out and coupled to the sweep circuits 17 of the receiver. Thus, the sweep circuits 17 are activated by the above-mentioned sync pulses and provide the voltages necessary to control the scanning action of the electron beam in the picture tube 11. Moreover, these sweep circuits 17 are coupled to the AGC means 15 in a manner such that the AGC means 15 is operable only when this signal is available. Such circuitry is usually referred to as "AGC Gating" and is also well known in the art. The AGC means 15 develops voltages which are coupled back to the RF and IF amplifiers stages, block 5, in a manner such that control over the signal available from the video amplifier 9 is exercised and the signal available therefrom remains substantially constant. In other words, the AGC means 15 develops voltages which are used to compensate for the wide variations in the strength of the signal intercepted by the antenna 3.

Additionally, the signal available from the video detector 7 is coupled to the separating means 13 and the AGC means 15 by way of a noise-gate transistor 19 located intermediate the separating means 13 and AGC means 15 and circuit ground. Thus, the operation of the separating means 13 and AGC means 15 is dependent not only upon the signal available from the video amplifier 9 but also upon the signal available from the video detector 7.

Referring now to the separating means 13, a triode-type electron discharge device 21 serves to illustrate the functioning thereof although a transistor of the NPN-type is also applicable and appropriate. The device 21 includes the usual anode 23, control grid 25, and cathode 27 with the anode 27 directly connected intermediate a pair of resistors 29 and 31 in series between a source of operational voltage, B+, and circuit ground. The anode 23 is also coupled to and provides a signal for synchronizing the usual sweep circuits 17.

The control grid 25 of the device 21 is A.C. coupled through a bias developing network 33 to a positive-going signal source available from the video amplifier 9. This network 33 is of a type frequently encountered in such separating circuitry and includes a relatively long-time constant capacitor 35 and resistor 37 combination as well as a short-time constant capacitor 39 and resistor 41 combination. Since the circuit functions in a well-known manner, it is believed sufficient to say that the components of the network are so chosen that the device 21 is biased to nonconduction except during the application of signals to the control grid 25 which exceed the well-known television signal blanking level. Moreover, this bias is developed by current drawn from the control grid 25 during the period of current flow in the device 21.

The cathode 27 of the device 21 is directly connected to circuit ground through the noise-gate transistor 19. This transistor 19 is of the NPN-type and the base 43 thereof is D.C. connected through a resistor 45 to a source 47 of bias as well as through a resistor 49 to a negative-going signal available from the detector 7. Alternately, any negative-going signal source is applicable so long as the strength or amplitude thereof varies in accordance with the strength of the received signal. Moreover, the bias source 47 may be a positive source of fixed value or preferably is a positive source which varies in accordance with the strength of the received signal. Thus, concurrent with a weak signal intercepted by the antenna 3, the bias applied to the base 43 of the transistor 19 is proportionally reduced and the effect of a weak intercepted signal on the functioning of the separating means 13 and AGC means 15 is substantially cancelled.

Referring to the AGC means 15, a triode-type electron discharge device 51 includes an anode 53, control grid 55, and cathode 57. The anode is directly connected intermediate a pair of resistors 59 and 61 disposed in series between a positive operational voltage source B+ and circuit ground. The anode output signal is coupled back to one or more of the RF and IF amplifying stages designated as block 5. The anode 53 is also coupled to the sweep circuits 17 wherefrom a positive retrace pulse is delivered which permits activation or "gating" of the device 51 as previously mentioned.

The control grid 55 is directly connected intermediate a pair of resistors 63 and 65 which are series connected between the positive-going signal available from the video amplifier 9 and circuit ground. These resistors 63 and 65 serve to couple the AGC means 15 to the video amplifier 9 with a minimum of disturbance thereto and to the separating means 13.

The cathode 57 is D.C. connected to the movable arm 71 of a potentiometer 67 in series with a resistor 69 intermediate an operational voltage source, B+, and circuit ground. This arm 71 is by-passed to circuit ground by way of a capacitor 73 and A.C. coupled through the capacitor 75 to a point 77 intermediate the transistor 19 and the cathode 27 of the device 21. Thus, a manually adjustable D.C. reference voltage is available to the cathode 57 of the AGC means 15 against which the output signal from the video amplifier 9 can be compared and corrected.

As to the operation, there is available at the load circuit of the video amplifier 9 a positive-going composite video signal which includes sync pulses and may include random noise pulses of greater amplitude than the sync pulses. Concurrently, a similar signal but opposite in phase is available at the load circuit of the video detector 7.

The positive-going signal is A.C. coupled from the video amplifier 9 through a bias developing network 33 to the control grid 25 of the discharge device 21 of the separating means 13. This same signal is also D.C. connected through a resistor 63 to the control grid 55 of the discharge device 51 in the AGC means 15. At the same time, a negative-going composite video signal from the video detector 7 is D.C. connected through a resistor 49 to the base 43 of the noise-gate transistor 19.

Assuming an operational condition such that the abovementioned positive and negative-going signals do not include random noise pulses of greater amplitude than the sync pulses and the signal strength does not suddenly vary from a very low value to a very high value, a positive-going sync pulse applied to the control grid 25 of the discharge device 21 in the separating means 13 causes current to flow therethrough which builds up a charge on the capacitor 35 of the bias developing network 33. This charge biases the discharge device 21 such that current conduction is, for all practical purposes, discontinued until such time as another sync pulse is applied to the control grid 25 and causes current to flow therein.

At the same time, a similar negative-going signal is applied to the base 43 of the noise-gate transistor 19 which is biased to saturated current flow for signals having an amplitude no greater than the amplitude of the sync pulses. Since the signal does not include random noise pulses of greater amplitude than the sync pulses, the negative-going signal does not reduce the flow of current through the transistor 19 and the separating means 13 is not disabled.

Concurrently, the positive-going signal is applied to the control grid 55 of the discharge device 51 in the AGC means 15. Moreover, the device 51 has a positive-going retrace pulse applied to the anode 53 thereof which is coincident in time with the arrival at the control grid 55 of the sync pulses contained in the signal. Further, a D.C. reference voltage is applied to the cathode 57 of the device 51 by way of the potentiometer arm 71. Thus, when the sync pulses in the signal applied to the control grid 55 are of sufficient amplitude to overcome the reference voltage on the cathode 57 and in correct time relationship with the retrace pulse applied to the anode 53, a signal is developed at the load circuit of the device 51 which is coupled back to the RF and IF amplifier stages in a manner such that the signal available from the video amplifier is maintained relatively constant.

Now, when the composite video signal includes noise pulses of greater amplitude than the sync pulses, a portion of these noise pulses will progress through the video amplifier 9 because of the limited signal handling capability thereof and arrive at the control grid 25 of the discharge device 21 in the separating means 13. This increased signal amplitude will tend to cause an increased current flow through and contribute to the development of an increased bias on the device 21. Such an increase in bias will tend to prevent the desired separation of the sync pulses from the signal and render the device 21 more susceptible to the amplification of the noise pulses. Thus, synchronization between the transmitted signal and received signal will be lost.

Also, the same signal applied to the separating means 13 will arrive at the control grid 55 of the discharge device 51 in the AGC means 15. Thus, the AGC system will tend to provide biasing voltage for the RF and IF amplifying stages of the receiver which vary in relation to the value of the noise pulses contained in the received signal and a cumulative deterioration of the signal to noise ratio in the receiver will result.

However, in time relationship with the arrival of the positive-going random noise pulses at the control grid 25 of the discharge device 51, negative-going noise pulses arrive at the base 43 of the noise-gate transistor 19. Since the transistor 19 is biased to saturated current flow for signals of an amplitude equal to or less than the amplitude of the sync pulses, the increased amplitude of the noise pulses will tend to reduce the flow of current therethrough. This reduced curent flow which approximates a cut-off condition in practical applications, serves to reduce the tendency for the development of an increased bias on the device 21 and thus permits the separating means 13 to function in a manner such that the sync pulses rather than the noise pulses are separated from the composite signal.

Further, when the current flow through the transistor 19 is reduced, a positive-going pulse is developed at a point 77 which is coupled by way of the capacitor 75 to the cathode 57 of the discharge device 51 in the AGC means. This positive-going pulse arriving at the cathode 57 in time relationship with the arrival of the positive noise pulse at the control grid 55 effectively provides a cancellation effect such that capacitor 73 intermediate the cathode 57 of the discharge device 51 in the AGC means 15 and circuit ground. In this manner rapid changes in the voltage at the cathode 57 due to the reduced current flow through the transistor 19 are prevented and sufficient cathode bypassing is provided, even when the transistor 19 is essentially cut off, to prevent degeneration in the AGC means 15 and destruction of the proper bias voltage development thereby. The partial bypass capacitor 73 is selected such that it is large enough to prevent the above-mentioned video overload condition from occurring and also as small as possible in order to prevent deterioration of the performance of the noise-gate.

Alternately, this video overload condition may be prevented by connecting a capacitor across the noise-gate transistor 19 from a point 77 to circuit ground. Since the magnitude of such a capacitor would be approximately twice the value of the partial bypass capacitor 73, the efficiency of the noise-gate transistor 19 would tend to decrease and somewhat impair the effectiveness of the circuitry.

Thus, there has been provided improved circuitry for separating the sync pulses and developing AGC voltage from a composite video signal which includes sync pulses and may include random noise pulses of greater amplitude than the sync pulses. This circuitry not only provides a maximum use of the total available video signal by utilizing D.C. coupling the signal available from the AGC means 15 which is coupled back into the RF and IF amplifiers remains substantially unaffected by the noise pulses.

As previously mentioned, it is desirable to use D.C. coupling of the composite video signal to the base 43 of the noise-gate transistor 19 in order to utilize the total output from the video detector to trigger the transistor 19. Unfortunately, it has been found that noise cancellation in the AGC system suffers when D.C. coupling is used because of a regenerative video overload condition which occurs when the receiver is switched from a weak or no signal to a strong input signal. As previously described, a strong signal greatly reduces the current flow through the transistor 19 and provides a large positive pulse which is coupled to the cathode 57 of the discharge device 51 in the AGC means 15. This reduces the output of the device 51 which is coupled back as a reduced bias on the RF and IF amplifier stages and permits the large negative output from the video detector 7 to maintain the greatly reduced current flow through the transistor 19. With the current flow through the transistor 19 reduced essentially to cut off in practical circuitry, there is no cathode bypassing for the AGC means 15 and degeneration destroys the proper bias development thereby.

However, this strong signal overload condition can be virtually eliminated by the inclusion of a partial bypass to the noise-gate transistor, but also provides maximum noise cancellation in the AGC system. Moreover, paralysis of the circuitry due to video overloading is virtually eliminated and the complexity and cost of the circuitry as well as the criticality thereof are greatly reduced.

As an illustration of a practical and workable circuit but in no way to be construed as limiting the invention, the following circuit values applied to the illustrated drawing are of significance:

| | | |
|---|---|---|
| Discharge device **21** | | ½ 10JT8 |
| Discharge device **51** | | ½ 5KD8 |
| Voltage source B+, D.C. | v | 270 |
| Voltage source 47, D.C. | v | 125 |
| Transistor **19** | | 2N306 |
| Capacitor **73** | μμf | 330 |
| Capacitor **75** | μfd. | .01 |
| Capacitor **35** | μfd. | .001 |
| Resistor **63** | ohms | 56,000 |
| Resistor **65** | do | 150,000 |
| Resistor **67** | do | 220,000 |
| Resistor **69** | do | 1,000,000 |
| Resistor **49** | do | 3,900 |
| Resistor **45** | do | 100,000 |

While there has been shown and described what is at present considered the preferred embodiment of the invention, it will be obvious to those skilled in the art that various changes and modifications may be made therein without departing from the invention as defined by the appended claims.

What is claimed is:

1. In a television receiver for utilizing a composite signal which includes synchronizing pulses and may include noise pulses of greater amplitude than the synchronizing pulses, a separating means and an AGC means coupled to source of composite signals and including a transistor means coupled to a source of oppositely phased composite signals and biased to reduce current flow therethrough in response to signals of greater amplitude than the amplitude of said synchronizing pulses, said transistor means including a capacitor by-passed transistor coupling said separating means and AGC means to circuit ground, said by-pass capacitor providing an A.C. path to ground and preventing degeneration in said AGC means when current flow through said transistor is reduced.

2. In a television receiver for utilizing a composite signal which includes synchronizing pulses and may include noise pulses of greater amplitude than the synchronizing pulses, a separating means and an AGC means coupled to a source of positive-going composite signals and including a transistor means directly connected to a source of negative-going composite signals and a source of positive bias voltage which varies directly with the strength of said signals, said transistor means having a reduced current flow therethrough in response to signals of greater amplitude than the synchronizing pulse amplitude from said source of negative-going signals and including a capacitor by-passed transistor directly connected intermediate said separating means and circuit ground and series connected to a capacitor intermediate said AGC means and circuit ground.

3. In a television receiver for utilizing a composite signal which includes synchronizing pulses and may include noise pulses of greater amplitude than the synchronizing pulses, a separating means and an AGC means coupled to a source of composite signals and including a transistor means coupled to a source of oppositely phased composite signals, said transistor means being biased to reduced current flow therethrough in response to signals of greater amplitude than said synchronizing pulse amplitude and including a transistor coupling said separating means and AGC means to circuit ground and a capacitor by-passing said AGC means to circuit ground, said capacitor providing an A.C. path to circuit ground and preventing degeneration in said AGC means when current flow through said transistor is reduced.

4. In a television receiver for utilizing a composite signal which includes synchronizing pulses and may include noise pulses of greater amplitude than the synchronizing pulses, a separating means and a AGC means coupled to a positive-going composite signal source and including a transistor means D.C. connected to a negative-going composite signal source and biased to reduced current flow therethrough in response to pulses of greater amplitude than the synchronizing pulse amplitude, said transistor means being directly connected intermediate said separating means and circuit ground and series connected to a capacitor intermediate said AGC means and circuit ground, said AGC means being directly connected to a reference voltage source having a by-pass capacitor intermediate said connection and circuit ground whereby said by-pass capacitor provides an A.C. path to circuit ground and prevents degeneration in said AGC means when current flow through said transistor means is reduced.

5. In a television receiver for utilizing a composite signal which includes synchronizing pulses and may include noise pulses of greater amplitude than the synchronizing pulses, a separating means and an AGC means couplde to a positive-going composite signal source and including a transistor means D.C. connected to a negative-going composite signal source and a positive bias source which varies directly with the strength of said signal, said transistor means being biased to reduced current flow therethrough in response to pulses of greater amplitude than the amplitude of said synchronizing pulses from said negative-going source and directly connected intermediate said separating means and ground and series connected to a capacitor intermediate said AGC means and circuit ground, said AGC means being directly connected to an adjustable reference voltage source having a by-pass capacitor coupling said connection to circuit ground whereby said by-pass capacitor provides an A.C. path to circuit ground and prevents degeneration in said AGC means when current flow through said transistor means is reduced.

6. In a television receiver for utilizing a composite signal which includes synchronizing pulses and may include noise pulses of greater amplitude than the synchronizing pulses, a separating means including a discharge device having an anode, control grid, and cathode, circuit means for connecting said anode to an operational voltage source and a load circuit and means for connecting the control grid to a source of positive-going composite signals; an AGC means including a discharge device having an anode, a control grid and a cathode, said anode being coupled to a source of operational voltage and a load circuit and said control grid connected to said source of positive-going composite signals; and a transistor means D.C. connected to a source of negative-going composite signals and biased to reduced current flow therethrough in response to signals of greater amplitude than said synchronizing pulses, said transistor means including a capacitor by-passed transistor coupling said cathodes of said discharge devices to circuit ground whereby said capacitor provides an A.C. path to circuit ground when current flow through said transistor is reduced.

7. In a television receiver for utilizing a composite signal which includes synchronizing pulses and may include noise pulses of greater amplitude than the synchronizing pulses, a separating means including a discharge device and a transistor, said discharge device having an anode connected to an operational voltage source and load circuit, a control grid A.C. coupled to a source of positive-going composite signals, and a cathode directly connected to circuit ground through said transistor; and an AGC means including a discharge device and said transistor, said discharge device having an anode coupled to an operational voltage source and a load circuit, a control grid directly connected to said positive-going composite signal source, and a cathode directly connected to an adjustable reference voltage source and A.C. by-passed to circuit ground by way of a series connected capacitor and said transistor and a capacitor by-passing said voltage source, said transistor being D.C. coupled to a source of negative-going signals and biased to reduced current flow therethrough in response to signals of greater amplitude than the amplitude of said synchronizing pulses whereby said voltage source capacitor provides an AC path for said cathode to circuit ground when current flow through said transistor is reduced and degeneration in the AGC means is prevented.

8. In a television receiver for utilizing a composite video signal which includes synchronizing pulses and may include noise pulses of greater amplitude than the synchronizing pulses, cooperatively coupled means including RF amplifying stages, a detector, IF amplifying stages, a video, detector, video amplifying stages, a separating means, and an AGC means, said separating means including an electron discharge device and a transistor with said discharge device having an anode connected to a source of operational voltage and a load circuit, a control grid A.C. coupled to a source positive-going video signals from said video amplifier stage, and a cathode D.C. connected to circuit ground through said transistor, said transistor being D.C. coupled to a negative-going signal source and biased to reduced current conduction in response to negative-going pulses having an amplitude greater than the amplitude of said synchronizing pulses; and an AGC means including an electron discharge device and said transistor, said discharge device having an anode coupled to a positive-going pulsating operational voltage source and through a load circuit back to said RF and IF amplifying stages, a control grid D.C. connected to said positive-going video signal source, and a cathode coupled to circuit ground by way of a series connected capacitor and said transistor and D.C. connected to an adjustable reference voltage source, said cathode having a capacitor by-passing said voltage source and providing an A.C. path to circuit ground for said cathodes when current conduction through said transistor is reduced.

No references cited.

DAVID G. REDINBAUGH, *Primary Examiner.*

J. McHUGH, *Assistant Examiner.*